(12) United States Patent
Shin et al.

(10) Patent No.: US 11,865,438 B2
(45) Date of Patent: Jan. 9, 2024

(54) OPERATION PEDAL AND OPERATION METHOD FOR SIMULATION DEVICE

(71) Applicant: P&I COMPANY, Jeju-si Jeju-do (KR)

(72) Inventors: Jea Jung Shin, Jeju-si Jeju-do (KR); Eun Seok Youn, Seoul (KR)

(73) Assignee: P&I COMPANY, Jeju-si (KR)

( * ) Notice: Subject to any disclaimer, the term of this patent is extended or adjusted under 35 U.S.C. 154(b) by 415 days.

(21) Appl. No.: 17/289,063

(22) PCT Filed: Oct. 28, 2019

(86) PCT No.: PCT/KR2019/014296
§ 371 (c)(1),
(2) Date: Apr. 27, 2021

(87) PCT Pub. No.: WO2020/085884
PCT Pub. Date: Apr. 30, 2020

(65) Prior Publication Data
US 2021/0402291 A1    Dec. 30, 2021

(30) Foreign Application Priority Data

Oct. 27, 2018 (KR) .......................... 10-2018-0129399
Oct. 24, 2019 (KR) .......................... 10-2019-0133307

(51) Int. Cl.
*A63F 13/245* (2014.01)
*A63F 13/212* (2014.01)
(Continued)

(52) U.S. Cl.
CPC .......... *A63F 13/245* (2014.09); *A63F 13/212* (2014.09); *G05G 1/305* (2013.01);
(Continued)

(58) Field of Classification Search
USPC .......................................................... 463/36
See application file for complete search history.

(56) References Cited

U.S. PATENT DOCUMENTS 5,269,687 A * 12/1993 Mott ..................... A63F 13/803
434/69
6,083,106 A *  7/2000 McDowell ............ A63F 13/803
463/6
(Continued)

FOREIGN PATENT DOCUMENTS

| JP | 07-200088 A | 8/1995 |
| KR | 2000-0037168 A | 7/2000 |
| KR | 10-1619095 B1 | 5/2016 |

*Primary Examiner* — Pierre E Elisca
(74) *Attorney, Agent, or Firm* — NKL LAW; Jae Youn Kim

(57) ABSTRACT

Disclosed is an operation pedal for a simulation device. The present invention comprises: a fixing shaft horizontally installed; a pedal main body mounted on the fixing shaft and rotatable in the forward and backward directions by an external force; a foothold mounted on the upper surface of the pedal main body and rotatable in the left and right directions by an external force; a forward and backward rotation sensing means for sensing a forward and rearward rotation of the pedal main body and transmitting a signal thereof; and a left and right rotation sensing means for sensing a left and right rotation of the foothold and transmitting a signal thereof. According to the present invention, a user can easily operate and control various action motions of a play object in a program by using both feet, such that more various motions or environments can be applied.

15 Claims, 23 Drawing Sheets

(51) Int. Cl.
*G05G 1/30* (2008.04)
*G05G 1/38* (2008.04)
*G05G 5/05* (2006.01)
*G05G 9/02* (2006.01)

(52) U.S. Cl.
CPC ............ *G05G 1/38* (2013.01); *G05G 5/05* (2013.01); *G05G 9/02* (2013.01); *A63F 2300/1012* (2013.01); *A63F 2300/1043* (2013.01); *A63F 2300/1062* (2013.01); *A63F 2300/8017* (2013.01); *A63F 2300/8082* (2013.01); *G05G 2505/00* (2013.01)

(56) References Cited

U.S. PATENT DOCUMENTS

| | | | |
|---|---|---|---|
| 6,452,120 B1 * | 9/2002 | Chen | G05G 1/30 200/86.5 |
| 2010/0060614 A1 * | 3/2010 | Enns | G06F 3/0383 345/184 |
| 2018/0280099 A1 * | 10/2018 | Cone | B25J 13/04 |

* cited by examiner

OPERATION PEDAL AND OPERATION METHOD FOR SIMULATION DEVICE

TECHNICAL FIELD

The present invention relates to a simulation device, and more particularly to an operation pedal of a simulation device capable of enabling a user to easily control various actions of a play target in a program of each of various kinds of simulation devices using two feet, whereby it is possible to realize various and more complicated actions above simple actions based on two-hand operation, and a method of operating the same.

BACKGROUND ART

As is generally known, electronic entertainment games using programs have been widely used by children and young people for a long time. With advancement of PCs and increasing availability of ultra-high speed Internet, online games have been abruptly activated in recent years. As a result, the online games have become established as a culture that everyone easily enjoys without distinction of age or sex.

The game industry has made rapid progress based thereon, and the kinds of the games encompass various ranges from simple brain games to various kinds of battle games, sports games, and motorcycle or car racing games. Consequently, users may select and play appropriate games based on their taste.

However, such a game is played using a joystick and buttons or is played using a keyboard and mouse of a computer in a state in which a PC or a game console is basically provided. All kinds of actions including actions of a player in the game are controlled by hands of a user who plays the game, whereby a sense of reality is greatly deteriorated. As a result, games developed with much effort and costs are disregarded due to little interest in many cases.

Also, for example, for a car racing game installed in an offline large-scale place of amusement, such as an amusement park, a car operation device configured to be similar to actual driving of a car is provided. In this case, however, it is not possible to feel a sense of reality, as in most games described above.

That is, all actions, such as starting and acceleration, turning, and stopping of the car, may be operated in a manner similar to those of an actual car. However, the user merely uses hands and feet in a standstill state in which the user sits in a chair. For example, the user cannot experience an inertia phenomenon in which the user's body slightly leans backwards or forwards at the time of starting or stopping the car or cannot experience a phenomenon in which the direction of the user's body is changed, like the player in the game, at the time of turning the car, whereby the user enjoys the game as if the user were the player in the game.

A simulation device is a device developed to produce such a game in a more realistic situation such that the user can feel an actual situation. The simulation device virtually realizes a situation that may actually occur using a computer program to provide indirect experience to the user. The simulation device may be applied to car, airplane, or motorcycle driving practices or games.

That is, a virtual three-dimensional situation is programmed, three-dimensional operations are provided by the simulation device such that the user can feel motion like an actual situation, and this is applied to various situations such that the user can experience a virtual situation like an actual situation.

The simulation device may be applied to various kinds of games or may be applied to various fields, such as various experiences or education and three-dimensional movie watching through simulation.

Furthermore, the simulation device is connected to a virtual reality device due to the characteristics of the device that enables the user to feel three-dimensional sensation, whereby a greater synergistic effect is obtained.

In general, the virtual reality device generates an image and a sound through a head mounted display (HMD) equipped with a monitor and a speaker and operates a chair to provide virtual reality to the user.

That is, a dynamic change based on a virtual environment is reproduced through a bodily sensation device controlled by a computer, such as the HMD and the chair, such that the user can feel virtual reality like actual reality. The virtual reality device is being widely used in game centers or three-dimensional movie theaters.

In order to more realistically realize a virtual environment reproduced by the computer and a bodily sensation of the user in the virtual reality device, it is necessary to variously drive the chair of the user in order to dynamically reproduce a dynamic change.

That is, it is possible to provide a sense of reality to the user by fluctuating and rotating the chair in three dimensions. To this end, the simulation is applied.

The simulation device is utilized as a device that enables the user to feel an actual situation even in virtual reality as well as a game or education device using a general monitor. Conventionally, a device configured to drive the chair that the user uses for simulation is too complicated and expensive. In addition, the volume of the device is large, whereby the device is inefficient. Furthermore, the device has a limitation in reproducing a sense of reality due to operations that do not come up to an actual situation.

Meanwhile, Korean Patent Application Publication No. 2000-0037168 discloses a bicycle exercise/game device capable of improving an exercise effect while satisfying a sense of reality and interest based on game play.

In this technology, a user on a stationary bicycle moves a handle according to a programmed screen (course), and load is applied to pedals of the bicycle or a saddle is vibrated based on topographical features, such as inclinations or obstacles such that the user obtains a cardiovascular exercise effect while feeling a sense of reality similar to as if the user rode the bicycle in an actual situation.

In this technology, however, only the handle of the bicycle is moved according to the driving course displayed on the screen of a display provided in front in the state in which the bicycle is stationary, merely load is applied to the pedals of the bicycle or vibration is generated in response to programmed topographical features of the course. Consequently, there is a problem in that it is not possible to induce actual experience that the user's body can feel when actually riding the bicycle, such as an inertia phenomenon and change of direction.

Korean Registered Patent No. 10-1619095 discloses a bicycle type game simulation device, which has been filed by the applicant of the present application as a prior application, as technology for solving the above conventional problems.

In this technology, swing footholds are provided respectively at two pedals of a crank pedal unit, a forward and rearward rotation sensing means configured to sense forward and reverse rotation of a crankshaft and a swing sensing means configured to sense leftward and rightward rotation of each swing foothold are provided, and actions of a player in a game are controlled in response to signals thereof, whereby it is possible to enjoy the game with a sense of reality while easily operating the device.

In the prior application technology of the applicant of the present application, however, the structure is somewhat complicated, and the actions of the player are controlled according to only the signals based on the forward and rearward operation of the crank pedal unit and the leftward and rightward rotation of the two swing footholds, whereby there is a limitation in controlling various actions of the player.

In particular, a virtual reality (VR) game has been spotlighted in recent years. As a result, various actions of the player in the game are required similar to actual reality. Since the number of cases in combination of control signals is small, however, efficient correspondence is difficult.

In addition, it is not easy to operate the swing units installed at the pedals simultaneously with rotation of the crank pedal unit using two feet.

Consequently, control of actions of the player is limited, which may become a serious obstacle in realizing various motions of the player having a sense of reality.

DISCLOSURE

Technical Problem

The present invention has been made in view of the above conventional problems, and it is an object of the present invention to provide an operation pedal of a simulation device capable of enabling a user to easily control various actions of a play target in a program using two feet, whereby it is possible to more conveniently play the game with joy, and capable of realizing various and more complicated actions above simple actions based on two-hand operation and a method of operating the same.

It is another object of the present invention to provide an operation pedal of a simulation device capable of greatly increasing the number of actions of a player in a program that a user can control using two feet, whereby it is possible to freely realize various actions having a sense of reality.

It is a further object of the present invention to provide a simulation device applicable to a virtual reality device related to various kinds of games or education and connectable to an additional device, whereby scalability of the simulation device is high.

Technical Solution

In order to accomplish the above objects, an operation pedal of a simulation device according to the present invention includes a stationary shaft horizontally installed, a pedal main body mounted to the stationary shaft, the pedal main body being configured to be turned in a forward-rearward direction by external force, a foothold mounted to the upper surface of the pedal main body, the foothold being configured to be turned in a leftward-rightward direction by external force, a forward and rearward turning sensing means configured to sense forward and rearward turning of the pedal main body and to transmit a signal thereof, and a leftward and rightward turning sensing means configured to sense leftward and rightward turning of the foothold and to transmit a signal thereof.

According to a preferred feature of the present invention, the forward and rearward turning sensing means may include a sensing dog mounted to the stationary shaft and forward and rearward turning sensors installed at the pedal main body so as to be located at the front and the rear of the stationary shaft, the forward and rearward turning sensors being configured to come into contact with the sensing dog according to forward and rearward turning of the pedal main body.

Each of the forward and rearward turning sensors may be constituted by a potentiometer, and the speed of a corresponding action of a play target in a game may be changed in proportion to the turning angle of the pedal main body.

According to another feature of the present invention, the operation pedal may further include a main body position setting means configured to maintain the pedal main body so as to be placed at a predetermined reference position in the state in which there is no external force and to allow the pedal main body to be turned when external force is applied thereto. Here, the predetermined reference position may be, for example, a horizontal state.

The main body position setting means may include a torsion spring mounted to the stationary shaft, a spring guide fixed to the stationary shaft so as to support the torsion spring, and front and rear pushers provided at the pedal main body so as to come into contact with opposite free ends of the torsion spring, respectively.

Here, the upper surface of the spring guide is formed as an inclined surface that is gradually inclined downwards from a middle portion to opposite ends thereof in a forward-rearward direction. As a result, the forward and rearward turning angle of the pedal main body may be limited to a predetermined angle range.

According to another feature of the present invention, the leftward and rightward turning sensing means may include leftward and rightward turning sensors mounted to the pedal main body and left and right sensing protrusions provided respectively at opposite sides of the lower surface of the foothold so as to come into contact with the leftward and rightward turning sensors according to turning of the foothold.

Each of the leftward and rightward turning sensors may be constituted by a potentiometer, and the speed of a corresponding action of a play target in a game may be changed in proportion to the turning angle of the foothold.

In addition, the lower surface of each of the sensing protrusions configured to come into contact the leftward and rightward turning sensors may be formed as an inclined surface having an angle corresponding to the turning angle of the foothold in order to perform accurate sensing.

According to another feature of the present invention, the operation pedal may further include a foothold position setting means configured to maintain the foothold so as to be placed at a predetermined reference position in the state in which there is no external force and to allow the foothold to be turned when external force is applied thereto.

The foothold position setting means may include a plurality of coil springs provided at predetermined positions between the pedal main body and the foothold so as to elastically bias the foothold.

The operation pedal according to the present invention may include two pedals, such as a left pedal and a right pedal, and the action of a play target in a game may be controlled by each or a combination of the pedals.

According to another feature of the present invention, the operation pedal may further include a swing foothold installed on the foothold so as to be rotated by a predetermined angle in a horizontal direction by external force and a swing foothold rotation sensing means configured to sense rotation of the swing foothold and to output a signal thereof.

As a result, direction change may be performed by horizontal rotation of the swing foothold, and the swing foothold rotation sensing means may be constituted by an encoder or a sensor.

According to another feature of the present invention, the operation pedal may further include a swing foothold position setting means configured to maintain the swing foothold so as to be placed at a predetermined reference position in the state in which there is no external force and to allow the swing foothold to be rotated when external force is applied thereto.

The swing foothold position setting means may include an arc-shaped guide slot formed in the foothold so as to have a curvature corresponding to the rotational curvature of the swing foothold, a stopper provided at the swing foothold so as to be moved along the guide slot, and an elastic means configured to elastically bias opposite sides of the stopper in opposite directions.

According to another feature of the present invention, the swing foothold may be installed at each of two pedals, such as a left pedal and a right pedal, and the operation pedal may further include a swing foothold interlocking means configured to allow the two swing footholds to be simultaneously rotated in an identical direction.

The swing foothold interlocking means may include an interlocking wire having opposite ends connected respectively to the swing footholds and a wire guide configured to guide the interlocking wire so as to be pulled along a predetermined track when the swing footholds are rotated.

According to another feature of the present invention, the operation pedal may further include a tracking sensor configured to sense a rotation trajectory of the operation pedal and to output a signal thereof.

According to another feature of the present invention, there is provided a method of operating an operation pedal of a simulation device in order to move a play target, the simulation device including two pedals, such as a left pedal and a right pedal, wherein the play target moves forwards when both the left and right pedals are pushed forwards, the play target moves rearwards when both the left and right pedals are pushed rearwards, the play target moves sidewise rightwards when only the right pedal is pushed rightwards, the play target moves sidewise leftwards when only the left pedal is pushed leftwards, the play target pivots on a right foot in a clockwise direction or in a counterclockwise direction when only the left pedal is pushed forwards or rearwards, the play target pivots on a left foot in the clockwise direction or in the counterclockwise direction when only the right pedal is pushed forwards or rearwards, the play target jumps in place when the left and right pedals are simultaneously pushed outwards, the play target jumps leftwards or rightwards when the left and right pedals are simultaneously pushed leftwards or rightwards, the play target turns right in place when the right pedal is pushed rearwards while the left pedal is pushed forwards, and the play target turns left in place when the left pedal is pushed rearwards while the right pedal is pushed forwards.

The left turn or the right turn may be performed by horizontally rotating the left pedal or the right pedal.

Advantageous Effects

In an operation pedal of a simulation device according to the present invention, a play target in a program walks or runs by a user turning the operation pedal in a forward-rearward direction using two feet, and the play target turns leftwards or rightwards and at the same time the screen is shifted by the user turning a foothold in a leftward-rightward direction.

Consequently, it is possible to realize much more diversified and increased actions than in the conventional art in which various actions of the play target in the program are controlled using only a keyboard or a joystick and a mouse, and it is possible for the user to be interested while having a higher sense of reality as if the user became the play target in the program and thus walked, ran, and looked around while changing direction.

In particular, the operation pedal includes a left pedal and a right pedal separated from each other so as to be independently driven. Consequently, it is possible to variously combine control signals together with a foothold provided at a pedal main body of each of the left and right pedals so as to be turned leftwards and rightwards, and therefore it is possible to realize the play target in the program so as to take various actions having a higher sense of reality.

In the case in which the operation pedal is coupled to the conventional joystick, keyboard, and mouse, it is possible to realize a wider variety of actions, and simple play having a higher sense of reality using two feet and two hands of the user is possible.

In addition, the two operation pedals configured to be independently driven are rotated within a predetermined angle range, unlike a conventional crank pedal. Consequently, it is possible for the user to very easily operate the footholds during operation thereof and to easily control the movement motion of the play target in the program using the two feet, whereby it is possible to provided extended convenience in operation.

BEST MODE

Figure 1:
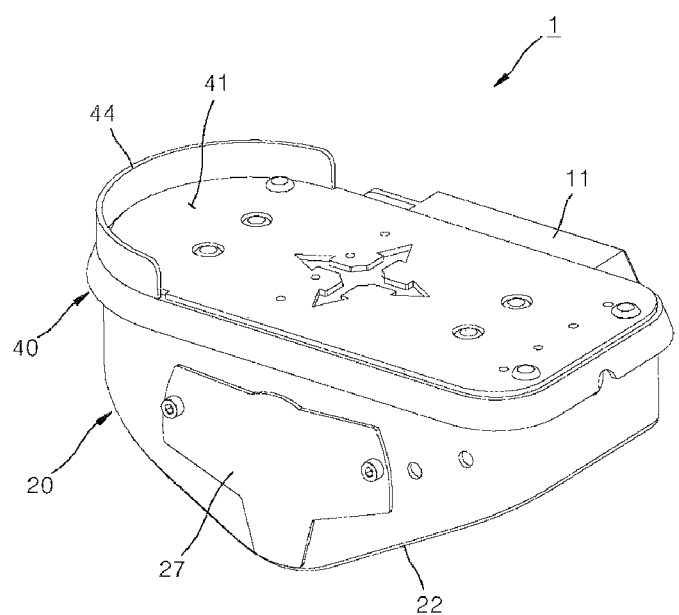
FIG. 1 is a perspective view showing an operation pedal of a simulation device according to the present invention.
Figure 2:
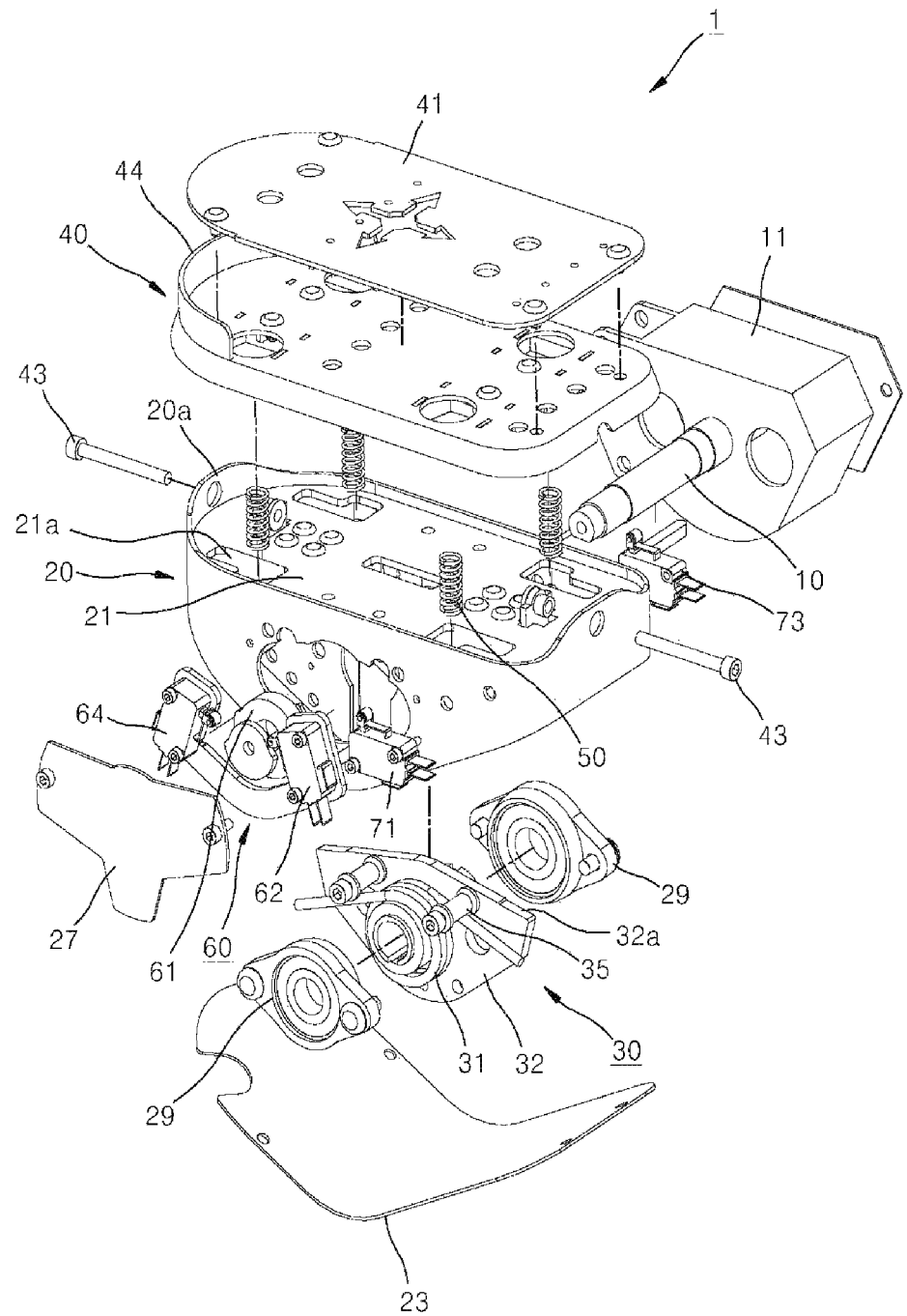
FIG. 2 is an exploded perspective view of the operation pedal of the simulation device according to the present invention when viewed from above.
Figure 3:
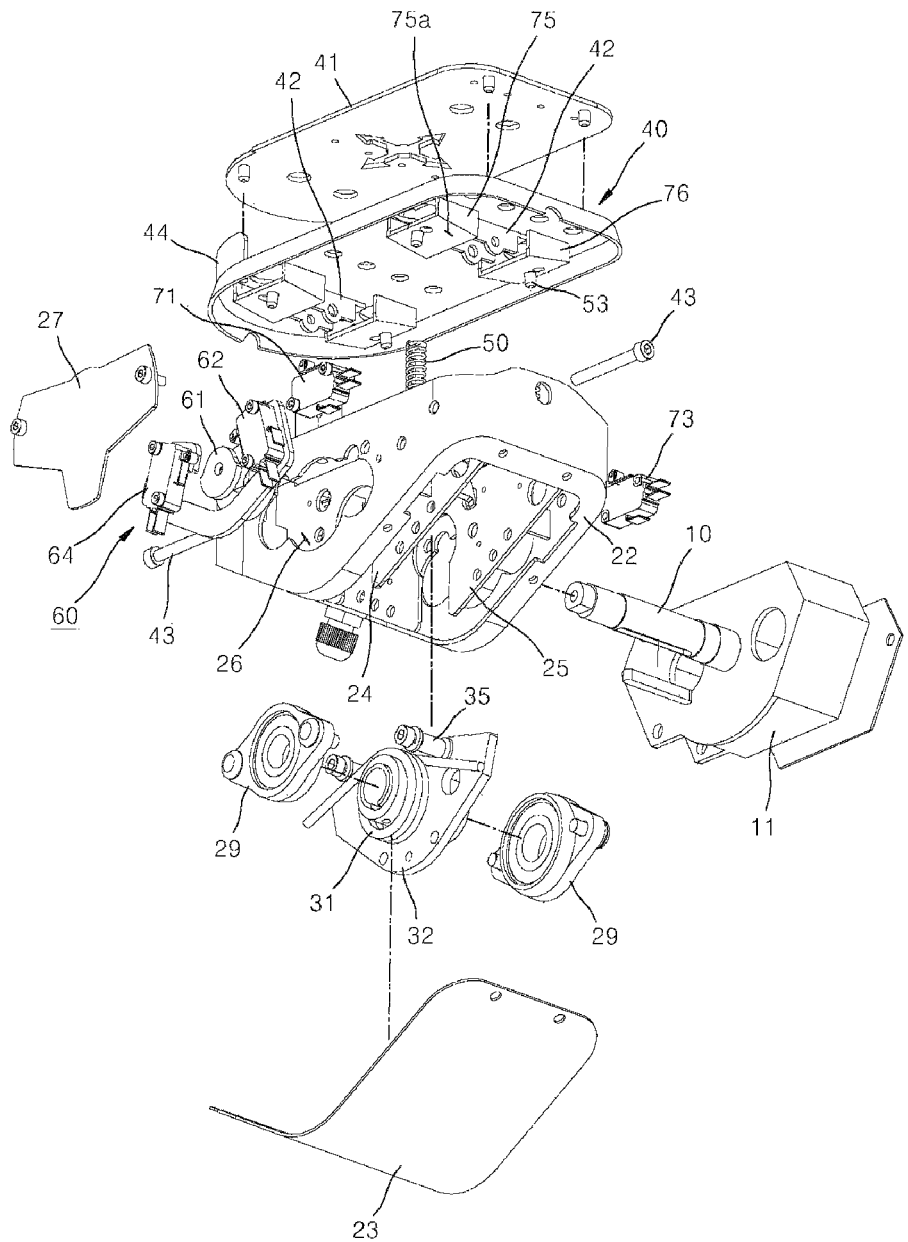
FIG. 3 is an exploded perspective view of the operation pedal of the simulation device according to the present invention when viewed from below.
Figure 4:
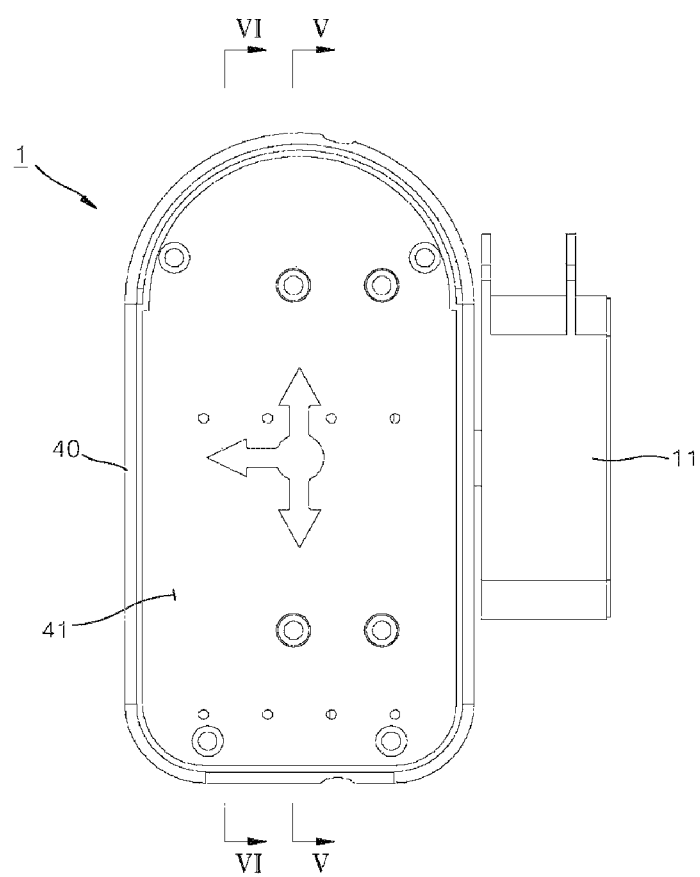
FIG. 4 is a plan view of the operation pedal of the simulation device according to the present invention.
Figure 5:
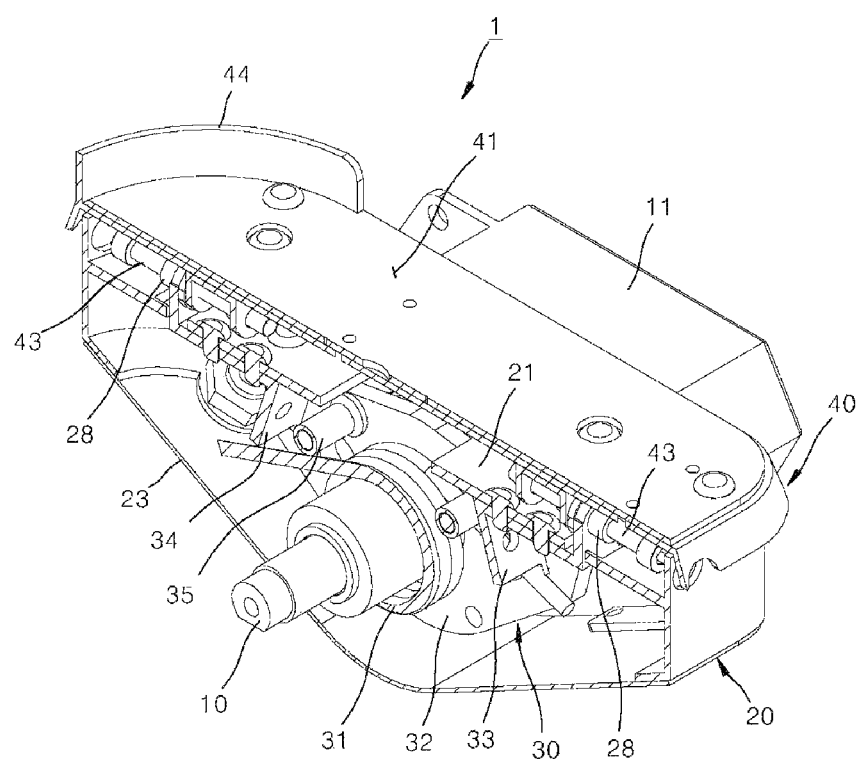
FIG. 5 is a cutaway perspective view taken along line V-V of FIG. 4.
Figure 6:
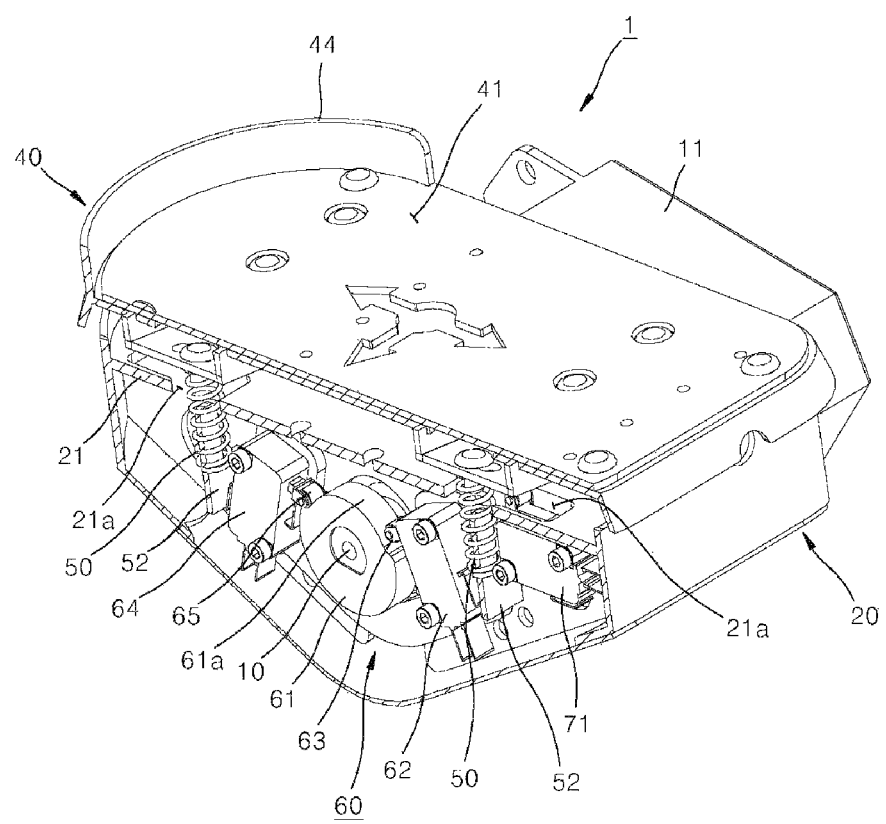
FIG. 6 is a cutaway perspective view taken along line VI-VI of FIG. 4.

Hereinafter, the details of the present invention will be described in detail with reference to the accompanying drawings as an embodiment.

A simulation device according to the present invention will be described on the assumption that the simulation device is applied to a game program for the sake of convenience.

In the drawings, the same elements according to respective embodiments are denoted by the same reference numerals.

Referring to FIGS. 1 to 6, an operation pedal 1 of a simulation device according to the present invention includes a stationary shaft 10 horizontally installed, a pedal main body 20 mounted to the stationary shaft 10, the pedal main body being configured to be turned in a forward-rearward direction by external force, a foothold 40 mounted to the upper surface of the pedal main body 20, the foothold being configured to be turned in a leftward-rightward direction by external force, a forward and rearward turning sensing means 60 configured to sense forward and rearward turning of the pedal main body 20 and to transmit a signal thereof, and a leftward and rightward turning sensing means 70 configured to sense leftward and rightward turning of the foothold 40 and to transmit a signal thereof.

Figure 7:
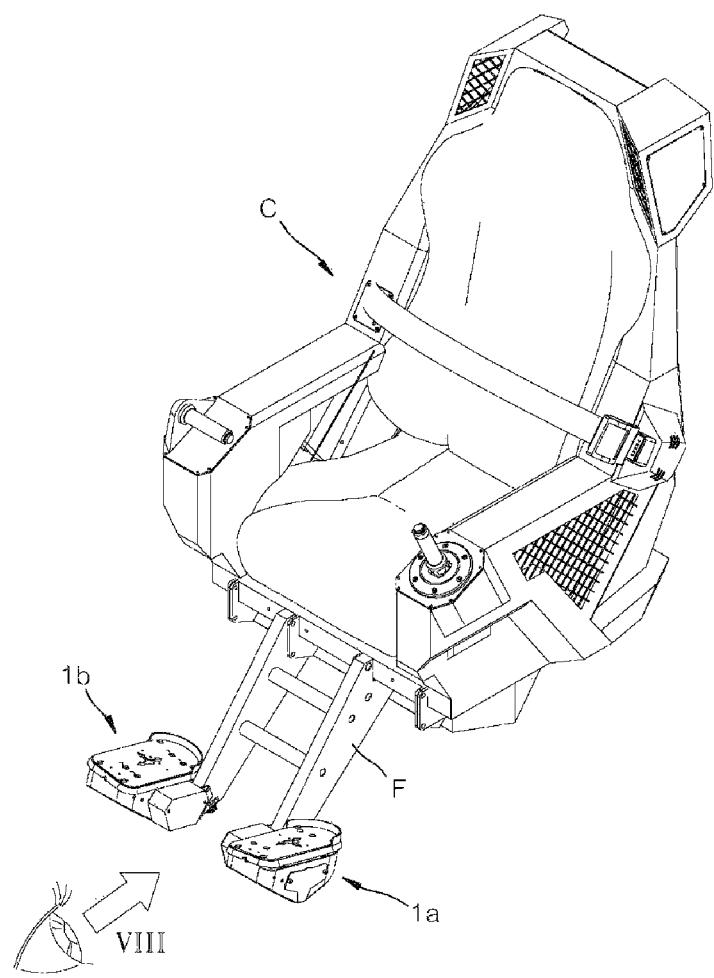
FIG. 7 is a perspective view showing an embodiment in which the operation pedal according to the present invention is applied to a simulation chair.

The stationary shaft 10 appropriately protrudes horizontally in the state in which one end of the stationary shaft is fixed to a shaft base 11 formed so as to have, for example, a block shape. The shaft base 11 is used to support the stationary shaft 10 and at the same time to fix the operation pedal 1 to a predetermined installation target, e.g. a mounting frame F of a chair C of the simulation device shown in FIGS. 7 to 9.

Although not shown separately, it is a matter of course that the stationary shaft 10 may be directly fixed to the mounting frame F of the chair C without the shaft base 11.

The shaft base 11 is necessary in order to constitute the operation pedal 1 as an independent component. Depending on circumstances, therefore, the shaft base 11 may not be necessarily provided.

The pedal main body 20 may be configured to have a barrel shape so as to receive the forward and rearward turning sensing means 60 and the leftward and rightward turning sensing means 70 therein. The upper surface 21 of the pedal main body 20 is formed so as to have a flat shape, whereas the height of the lower surface of the pedal main body gradually decreases from the middle thereof in a longitudinal direction (the forward-rearward direction) to opposite ends (the front end and the rear end) thereof, whereby the lower surface of the pedal main body is formed as a V-shaped inclined surface 22, the middle of which is convex.

The lower inclined surface 22 of the pedal main body 20 enables the operation pedal 1 to be turned about the stationary shaft 10 in the forward-rearward direction without trouble, such as interference with the floor.

The inclined surface 22 of the pedal main body 20 is opened such that other components, such as the forward and rearward turning and leftward and rightward turning sensing means 60 and 70, are mounted in the pedal main body 20, and is covered by a lower cover 23 formed so as to have a shape corresponding to the shape thereof.

In the pedal main body 20, first and second baffle plates 24 and 25 are provided vertically in a state of being spaced apart from each other. A through-slot 26, through which the forward and rearward turning sensing means 60 is mounted to the first baffle plate 24, is formed in the outer side surface of the pedal main body 20, and is covered by a side cover 27.

Four quadrangular guide slots 21a, through which a plurality of coil springs 50, which is a foothold position setting means, a description of which will follow, extend, are formed in the upper surface 21 of the pedal main body 20. A skirt 20a is formed on the edge of the upper surface 21 so as to have an appropriate height. In addition, bosses 28 configured to turnably connect the foothold 40 to the upper surface 21 of the pedal main body 20 are provided at the front end and the rear end of the upper surface of the pedal main body so as to be coaxial with each other in a protruding state.

The pedal main body 20 is coupled to the stationary shaft 10 so as to be turned in the forward-rearward direction. For smooth turning, it is preferable for the pedal main body to be coupled to the stationary shaft 10 via a bearing 29. For example, two bearings 29 may be provided so as to be located at opposite ends of the stationary shaft 10, and may be fixed to the first and second baffle plates 24 and 25, respectively.

Figure 10A:
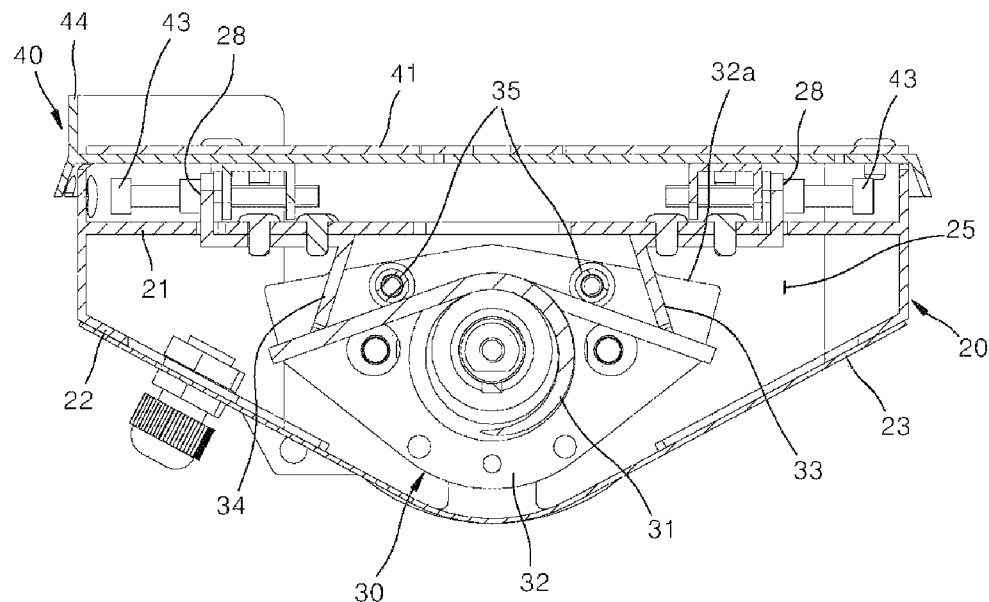
FIGS. 10A to 10C are sectional views showing the forward and rearward turning operation states of the operation pedal of the simulation device according to the present invention.
Figure 10B:
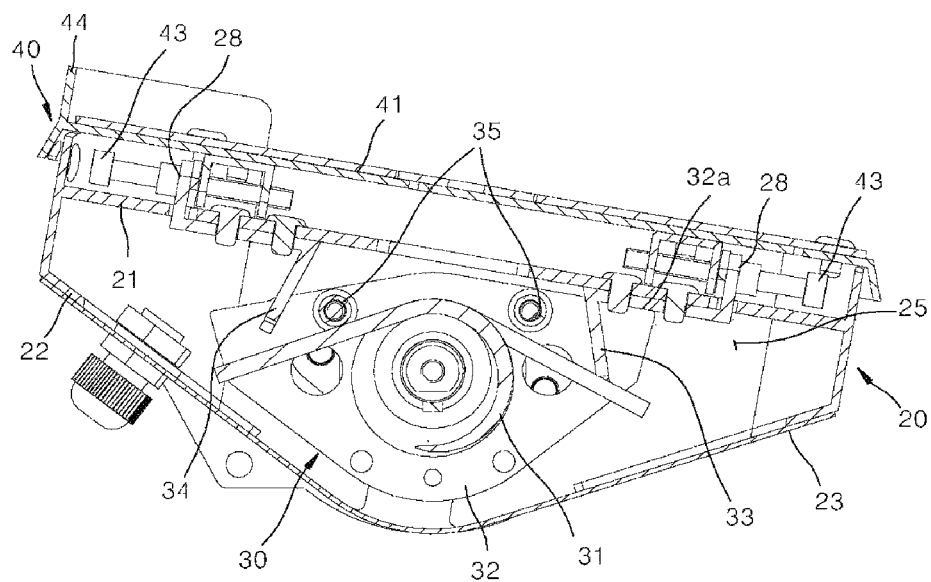
Figure 10C:
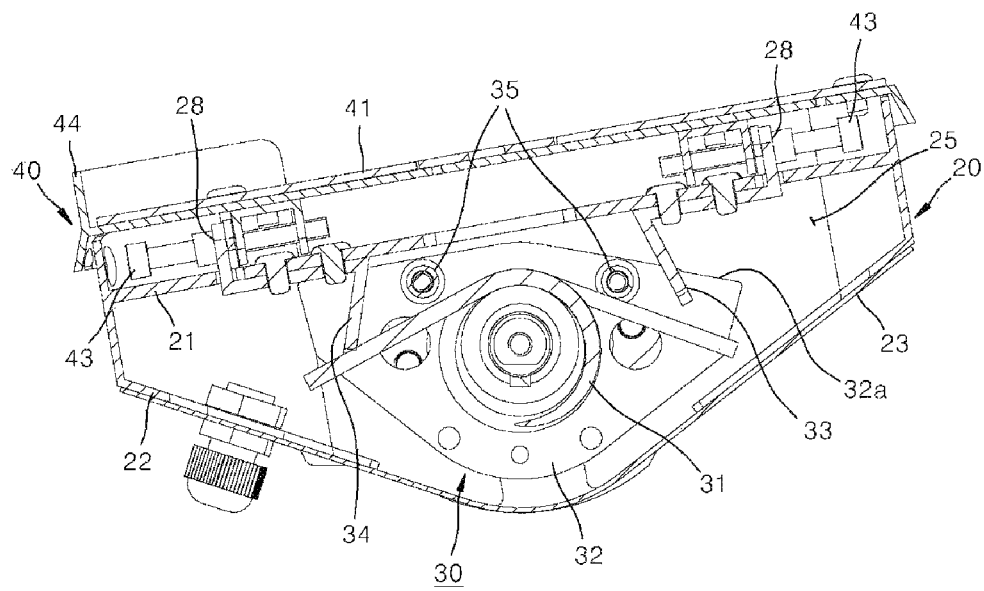

Meanwhile, as clearly shown in FIGS. 10A to 10C, the pedal main body 20 is maintained in a neutral state by a main body position setting means 30 configured to maintain the pedal main body at a predetermined reference position, e.g. in a horizontal state, when no external force is applied to the pedal main body and to allow the pedal main body to be turned forwards or rearwards only when external force is applied to the pedal main body such that the pedal main body is accurately operated.

The main body position setting means 30 may be variously configured. For example, the main body position setting means may include a torsion spring 31 mounted to the stationary shaft 10, a spring guide 32 fixed to the stationary shaft 10 so as to support the torsion spring 31, and front and rear pushers 33 and 34 provided at the upper surface 21 of the pedal main body 20 in a state of protruding downwards so as to come into contact with opposite free ends of the torsion spring 31, respectively.

The spring guide 32 has two stop pins 35 configured to support the opposite free ends of the torsion spring 31, and is fitted on the stationary shaft 10 so as to be fixed thereto in an integrated state. The torsion spring 31 and the spring guide 32 are located between the first and second baffle plates 24 and 25 of the pedal main body 20.

The upper surface of the spring guide 32 is formed as an inverse-V-shaped inclined surface 32a, which is gradually inclined downwards from the middle position thereof to opposite ends (the front end and the rear end) thereof in the longitudinal direction (the forward-rearward direction). As a result, the forward and rearward turning angle of the pedal main body 20 may be limited to a predetermined angle range.

When the external force applied to the pedal main body 20 is removed after a user turns the pedal main body forwards or rearwards using the main body position setting means 30, the pedal main body returns to the initial neutral state thereof due to restoring elasticity of the torsion spring 31, even though the user does not return the pedal main body to the initial position thereof.

That is, when no external force is applied to the operation pedal 1, as shown in FIG. 10A, the front and rear pushers 33 and 34 of the pedal main body 20 are simultaneously in contact with upper sides of the opposite ends of the torsion spring 31, whereby the horizontal neutral state of the pedal main body is maintained. However, when external force is applied to turn the operation pedal 1 forwards, as shown in FIG. 10B, the front pusher 33 of the pedal main body 20 is turned forwards to deform the torsion spring 31 in a clockwise direction, and when the external force is removed, the pedal main body returns to the initial neutral state thereof due to restoring elasticity of the torsion spring 31.

On the other hand, when the operation pedal 1 is turned rearwards in the neutral state thereof, as shown in FIG. 10C, the rear pusher 34 of the pedal main body 20 is turned rearwards to deform the torsion spring 31 in a counterclockwise direction, and when the external force is removed, the operation pedal 1 returns to the initial neutral state thereof due to restoring elasticity of the torsion spring 31.

The foothold 40 may be variously configured. Any type of foothold may be used as long as the user can easily step on the foothold and can stably operate the foothold. To this end, an anti-slip pad 41 may be provided at the upper surface of the foothold 40, i.e. the surface of the foothold with which a foot F of the user comes into contact.

The foothold 40 is provided at the front end and the rear end of the lower surface thereof with hinge brackets 42, which are connected respectively to the bosses 28 of the pedal main body 20 via hinge pins 43 such that the foothold 40 can be turned leftwards and rightwards. At this time, it is a matter of course that the hinge brackets may be coupled to the bosses 28 via bearings (not shown) in order to guarantee smooth turning of the foothold 40.

A support flange 44 configured to support the heel portion of the user such that the foot of the user remains in a state of being stably placed on the foothold may be provided at the edge of the rear end of the foothold 40.

In order to guarantee accurate operation of the foothold 40, the foothold is maintained in a neutral state by a foothold position setting means configured to maintain the foothold at a predetermined reference position, e.g. in a horizontal state, when no external force is applied to the foothold and to allow the foothold to be turned leftwards or rightwards only when external force is applied to the foothold, in the same manner as in the pedal main body 20.

The foothold position setting means may be variously configured. For example, the foothold position setting means may include four coil springs 50 provided at predetermined positions between the pedal main body 20 and the foothold 40 so as to elastically bias the foothold 40 upwards.

The coil springs 50 are supported by pluralities of spring supports 52 and 53 provided respectively at the first and second baffle plates 24 and 25 and the lower surface of the foothold 40 through the guide slots 21a formed in the upper surface of the pedal main body 20.

When the external force applied to the foothold 40 is removed after the user turns the foothold leftwards or rightwards, the foothold automatically returns to the initial neutral state thereof due to restoring elasticity of the coil springs 50, even though the user does not return the foothold to the initial position thereof.

Figure 12A:
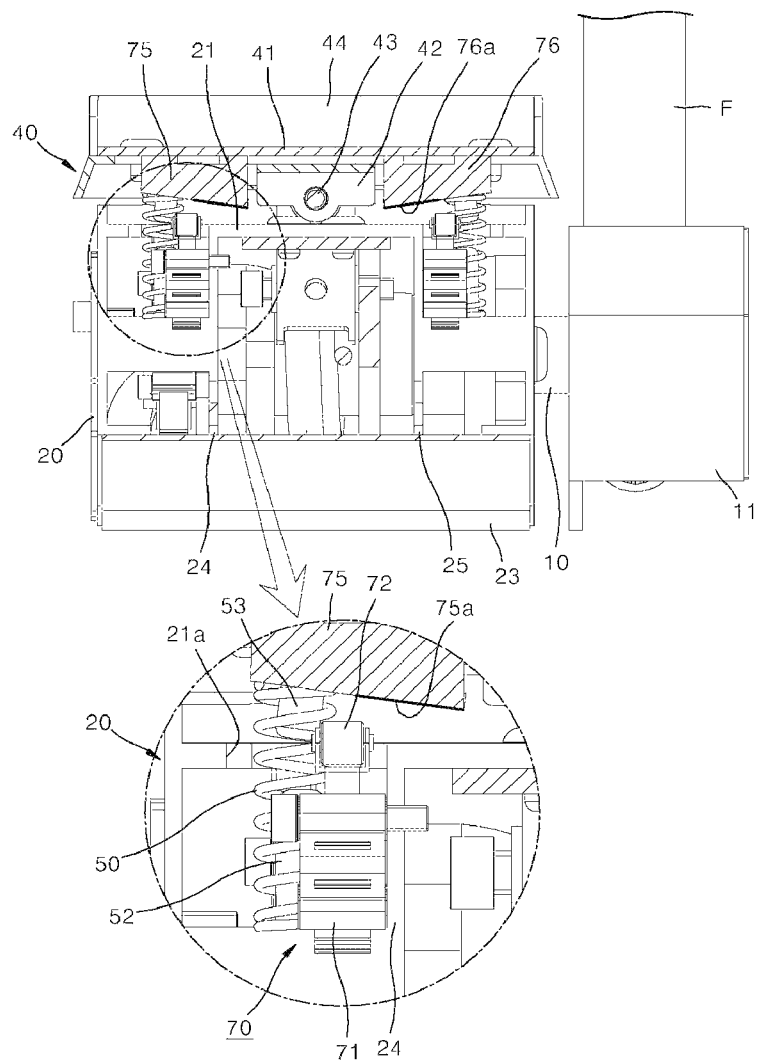
FIGS. 12A to 12C are sectional views showing the leftward and rightward turning operation states of the operation pedal of the simulation device according to the present invention.
Figure 12B:
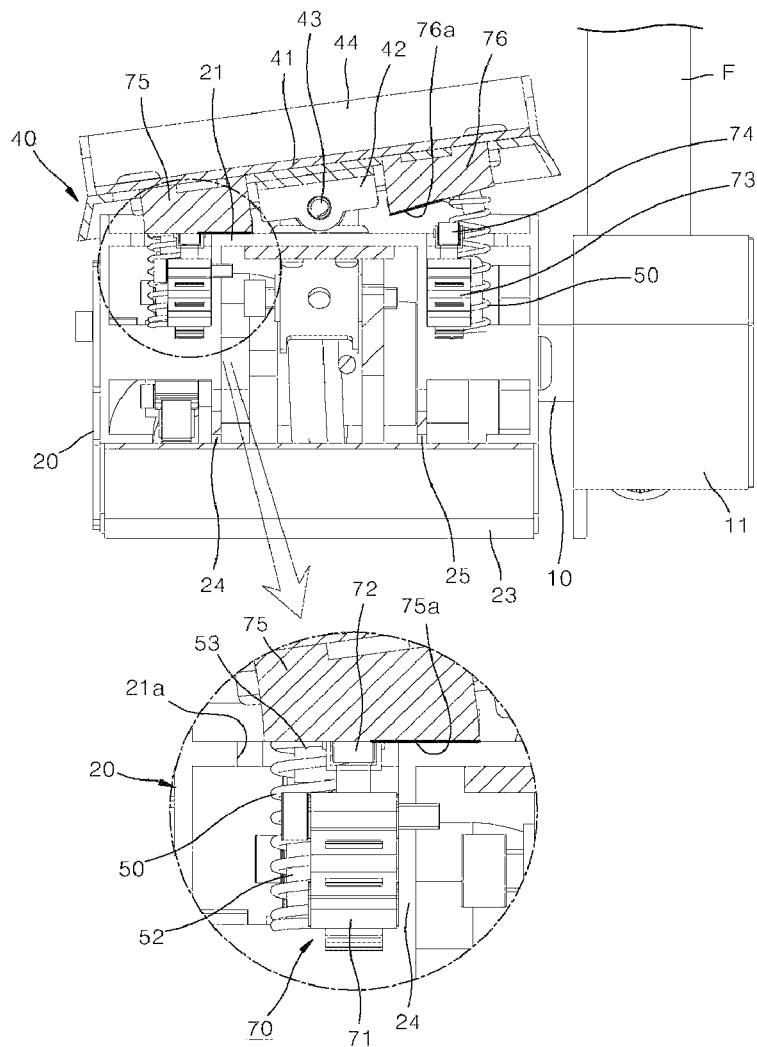
Figure 12C:
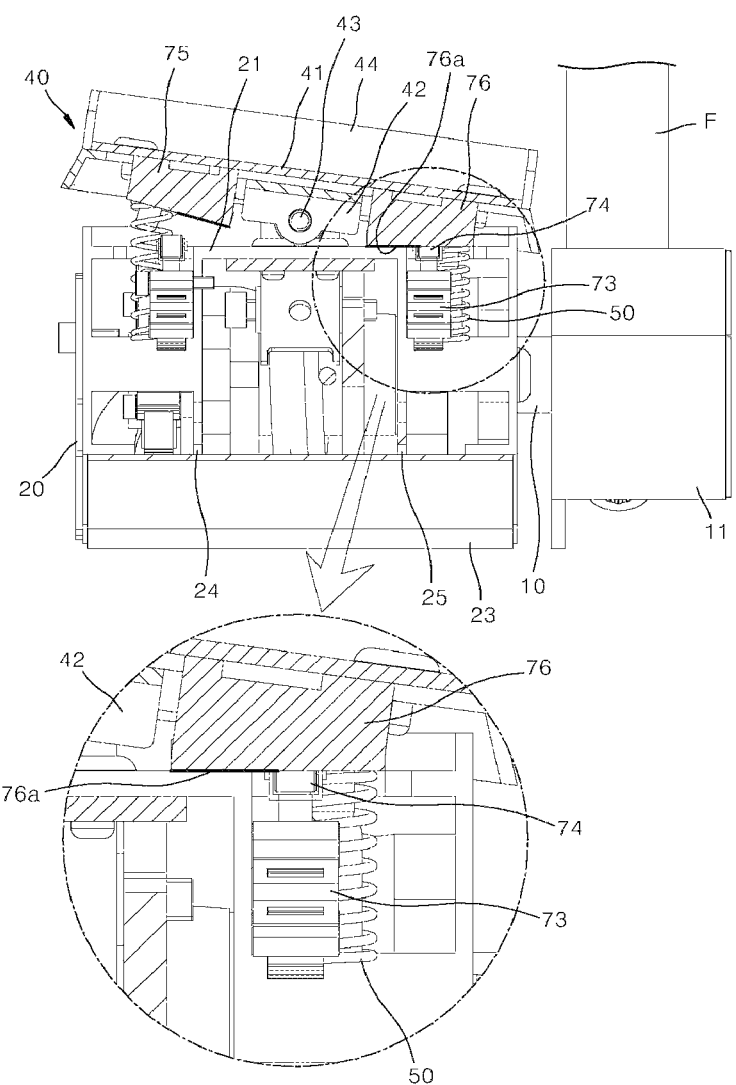

That is, when no external force is applied to the operation pedal 1, as shown in FIG. 12A, the foothold 40 is maintained in a horizontal neutral state by the four coil springs 50. However, when external force is applied to turn the foothold 40 rightwards, as shown in FIG. 12B, the right coil springs 50 are compressed, and when the external force is removed, the foothold returns to the initial neutral state thereof due to restoring elasticity of the compressed coil spring 50. On the other hand, when the foothold 40 is turned leftwards in the neutral state thereof, as shown in FIG. 12C, the left coil springs 50 are compressed, and when the external force is removed, the foothold 40 returns to the initial neutral state thereof due to restoring elasticity of the compressed coil spring 50.

Figure 11A:
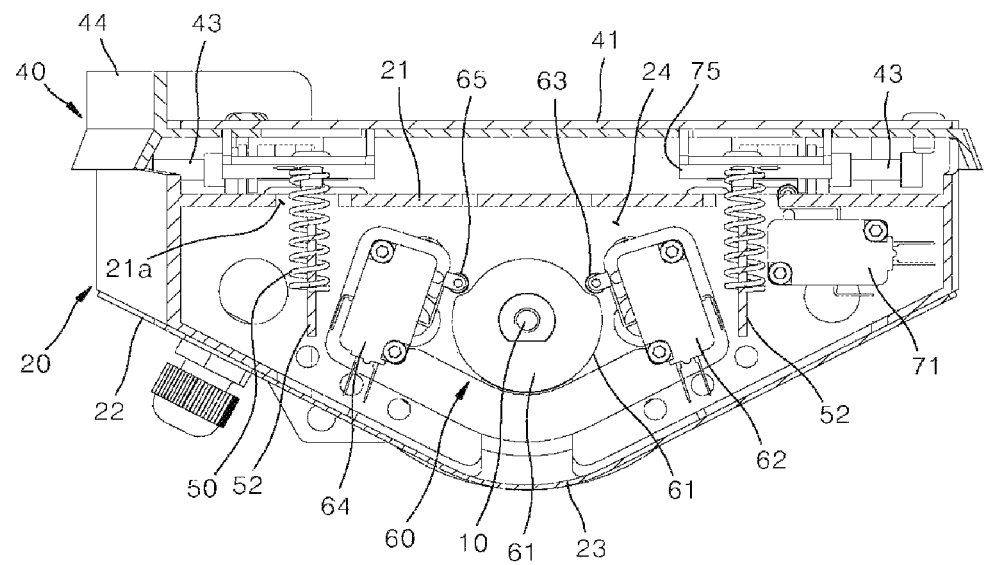
FIGS. 11A to 11C are sectional views showing the operations of a main body position setting means of the operation pedal of the simulation device according to the present invention.
Figure 11B:
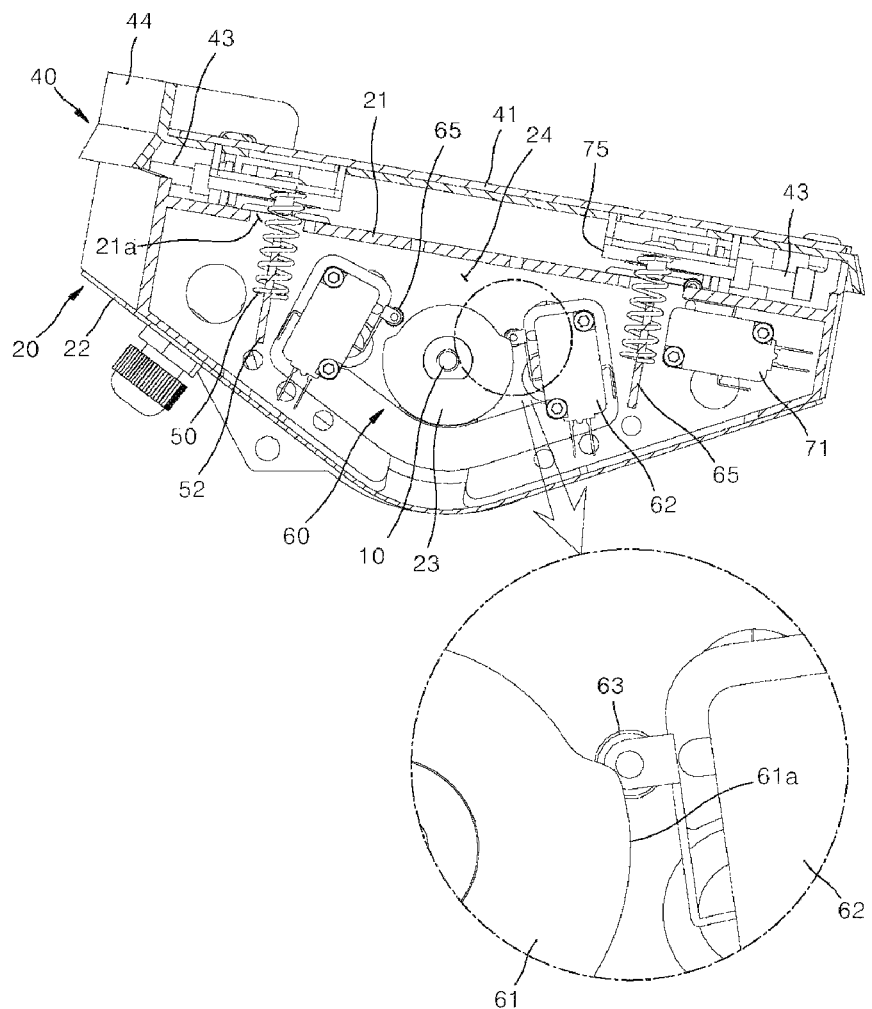
Figure 11C:
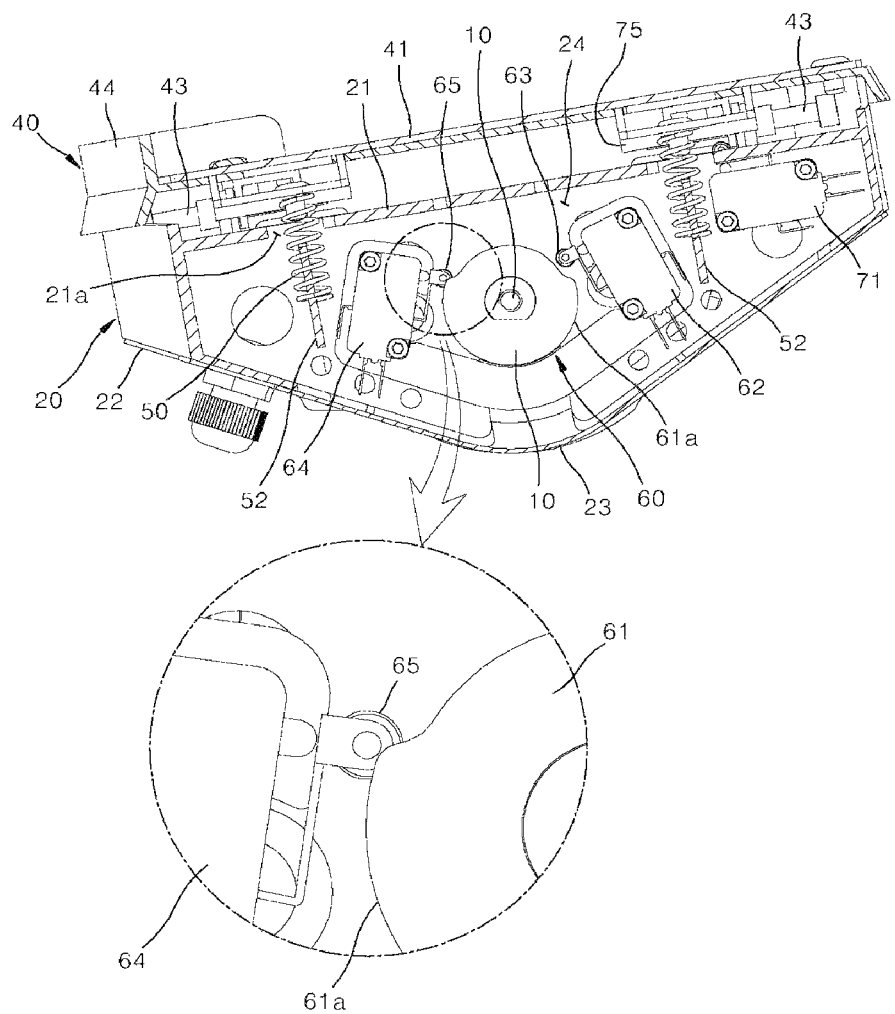

As clearly shown in FIGS. 11A to 11C, the forward and rearward turning sensing means 60 may include a sensing dog 61 fitted on the free end of the stationary shaft 10 in a fixed state and forward and rearward turning sensors 62 and 64 mounted to the pedal main body 20 so as to be located on a concentric circle around the sensing dog 61.

The sensing dog 61 is provided on the outer circumference thereof with a cam surface 61a configured to push contact points 63 and 65 of the forward and rearward turning sensors 62 and 64 when the pedal main body 20 is turned forwards and rearwards. That is, when the operation pedal 1 is turned forwards or rearwards in the neural state of FIG. 11A, as shown in FIGS. 11B and 11C, the forward and rearward turning sensors 62 and 64 fixed to the pedal main body 20 are simultaneously turned forwards or rearwards, whereby the contact points 63 and 65 thereof are turned on/off by the cam surface 61a of the sensing dog 61.

The forward and rearward turning sensors 62 and 64 are fixed to the first baffle plate 24 of the pedal main body 20 so as to be symmetric with respect to the stationary shaft 10 such that the forward and rearward turning sensors are turned simultaneously with turning of the pedal main body 20 in the forward-rearward direction, and have contact points 63 and 65 configured to come into contact with the sensing dog 61.

Various kinds of sensors may be adopted as the forward and rearward turning sensors 62 and 64. For example, potentiometers may be used, and the speed of a corresponding action of a play target in a game may be changed in proportion to the turning angle of the pedal main body 20.

Figure 9:
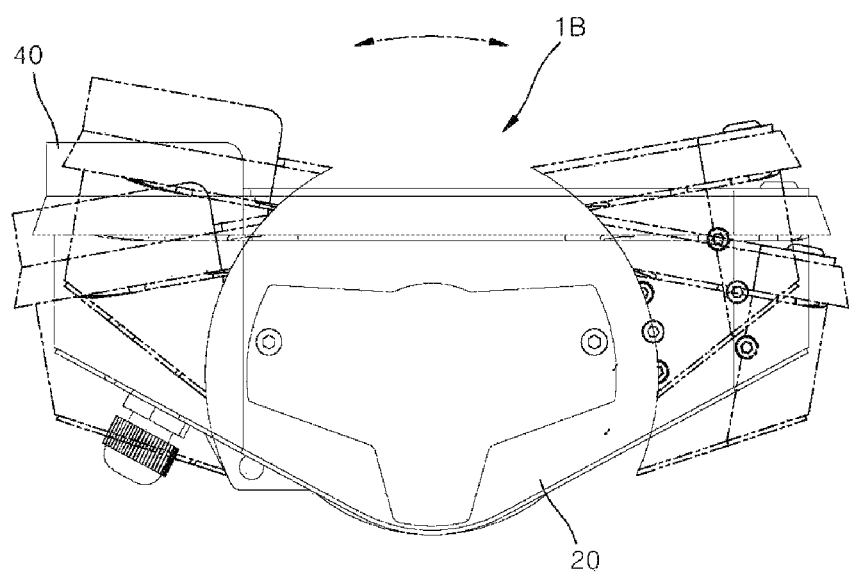
FIG. 9 is a side view taken in a direction indicated by IX of FIG. 8.
Figure 14:
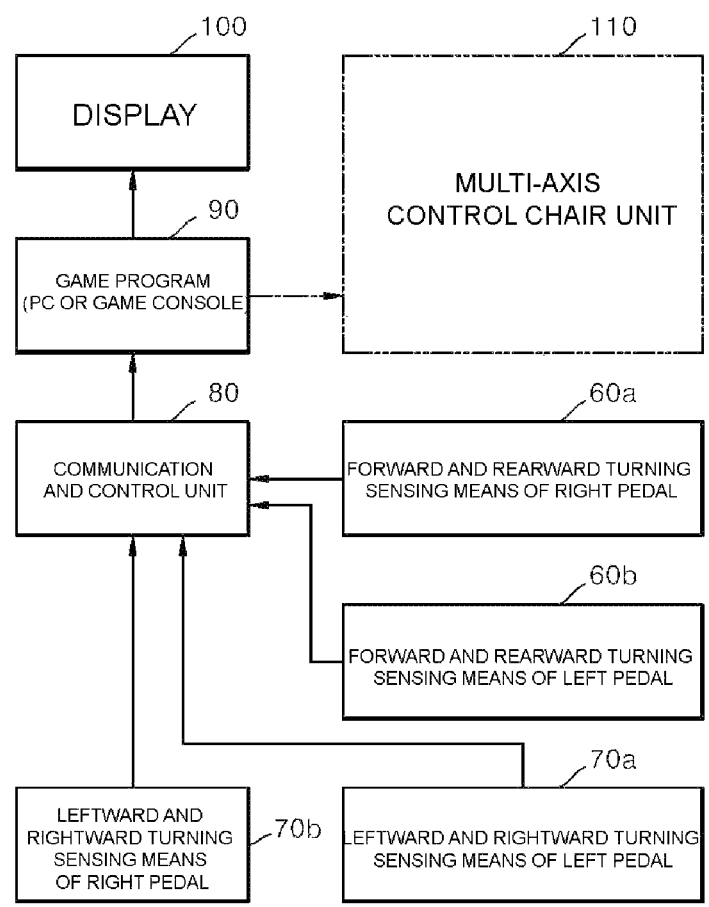
FIG. 14 is a block diagram illustrating operation of the operation pedal of the simulation device according to the present invention by way of example.
Figure 15:
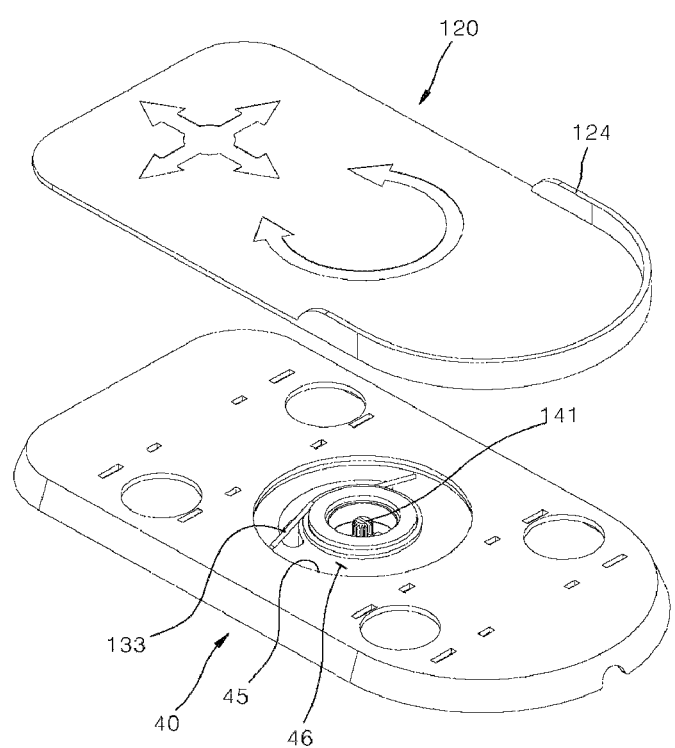
FIG. 15 is a perspective view showing another embodiment of the operation pedal according to the present invention in the state in which the principal parts thereof are separated from each other.
Figure 16:
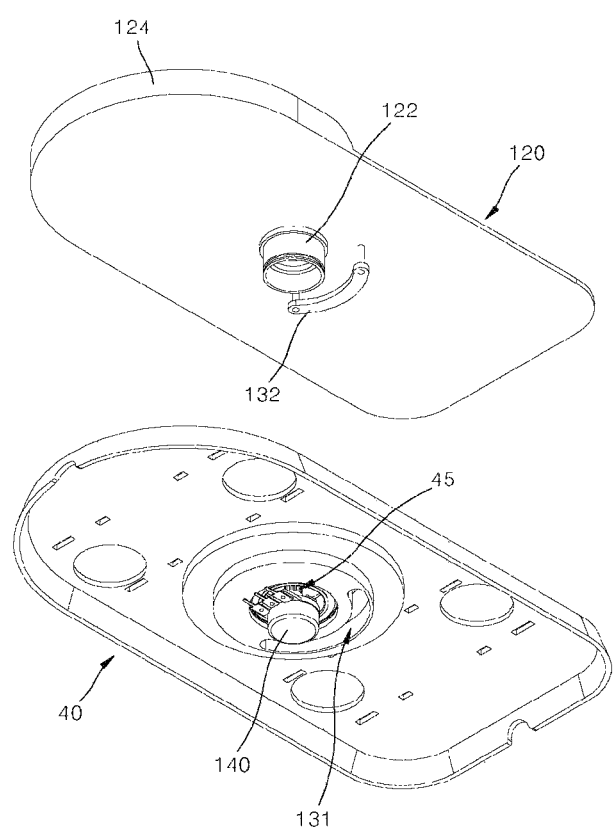
FIG. 16 is a bottom perspective view of FIG. 15.
Figure 17:
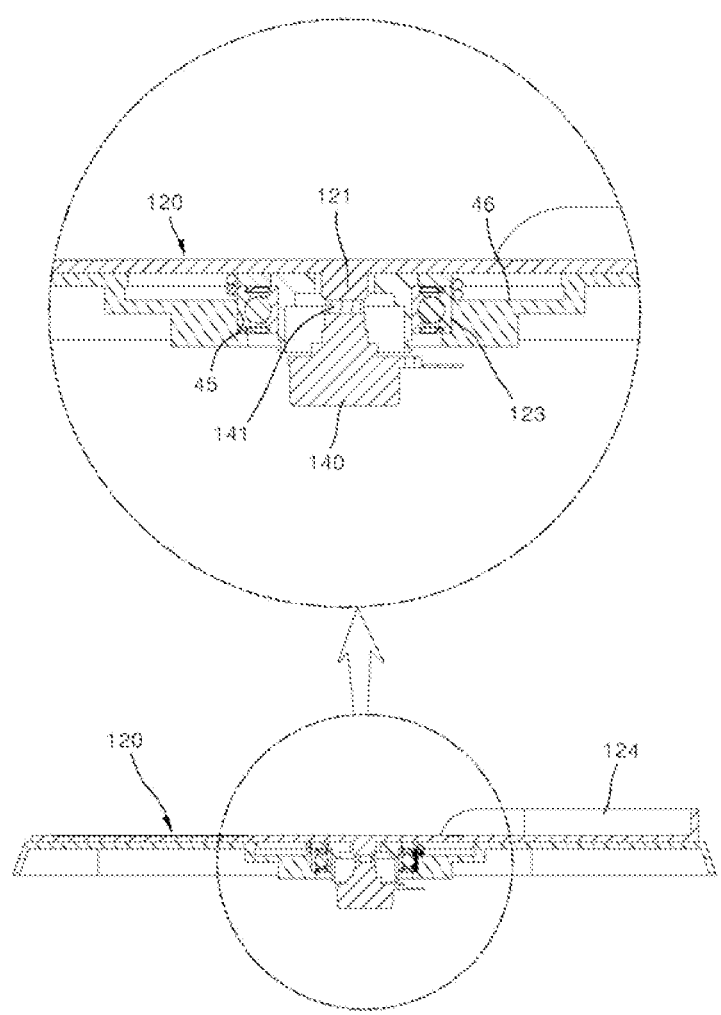
FIG. 17 is a partially enlarged sectional view showing the coupling state of the operation pedal shown in FIG. 15.
Figure 18:
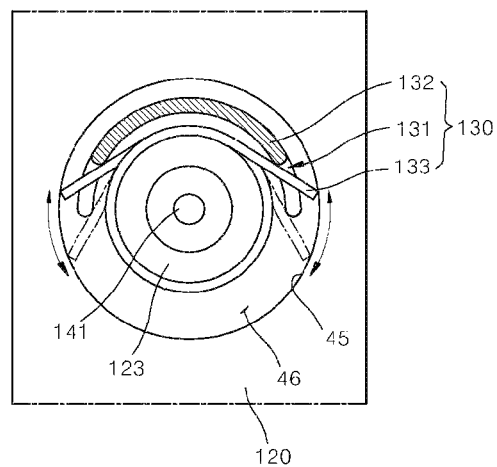
FIG. 18 is an extracted plan view showing a swing foothold position setting means of the operation pedal shown in FIG. 15.
Figure 19:
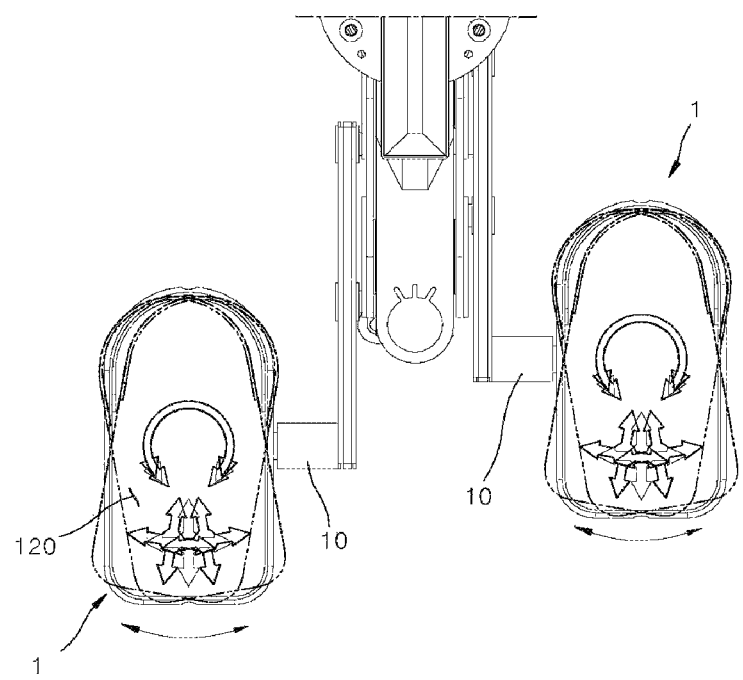
FIG. 19 is a plan view showing the operation state of the operation pedal shown in FIG. 15.

As shown in FIGS. 9 and 14, the forward and rearward turning sensors 62 and 64 of the forward and rearward turning sensing means 60 sense forward turning (turning in the clockwise direction in the figures) and rearward turning (turning in the counterclockwise direction in the figures) of the pedal main body 20, respectively, and transmit signals thereof to a communication and control unit 80 of the simulation device.

As clearly shown in FIGS. 12A to 12C, the leftward and rightward turning sensing means 70 may include leftward and rightward turning sensors 71 and 73 mounted to the pedal main body 20 in a state of being spaced apart from each other in a leftward-rightward direction and left and right sensing protrusions 75 and 76 provided respectively at opposite sides of the lower surface of the foothold 400 so as to push contact points 72 and 74 of the leftward and rightward turning sensors 71 and 73 when the foothold 400 is turned leftwards and rightwards.

The leftward turning sensor 71 is fixed to the first baffle plate 24 so as to correspond to the guide slots 21a of one side of the pedal main body 20 such that the contact point 72 faces upwards, and the rightward turning sensor 73 is fixed to the second baffle plate 25 so as to correspond to the guide slots 21a of the other side of the pedal main body 20 such that the contact point 74 faces upwards.

Various kinds of sensors may also be adopted as the leftward and rightward turning sensors 71 and 73. For example, potentiometers may be used, and the speed of a corresponding action of the play target in the game may be changed in proportion to the turning angle of the foothold 400.

It is preferable that the lower surfaces of the sensing protrusions 75 and 76 be formed as inclined surfaces 75a and 76a that are gradually inclined upwards from the insides to the left and right outsides thereof. The reason for this is that the left and right sensing protrusions 75 and 76 push the contact points 72 and 74 of the leftward and rightward turning sensors 71 and 73 as the result of turning of the foothold 40, whereby it is possible to guarantee more accurate operation, and it is necessary to appropriately limit the leftward and rightward turning angle of the foothold 40 to a predetermined range.

Consequently, when no external force is applied, as shown in FIG. 12A, the contact points 72 and 74 of the leftward and rightward turning sensors 71 and 73 are spaced apart from the left and right sensing protrusions 75 and 76 of the foothold 40, whereby the foothold is maintained in a neutral state. When external force is applied and thus the foothold 40 is turned rightwards or leftwards, as shown in FIGS. 12B and 12C, the contact point 72 or 74 of the leftward turning sensor 71 or the rightward turning sensor 73 is pushed by the left sensing protrusion 75 or the right sensing protrusion 76 and is thus turned on/off.

Figure 8:
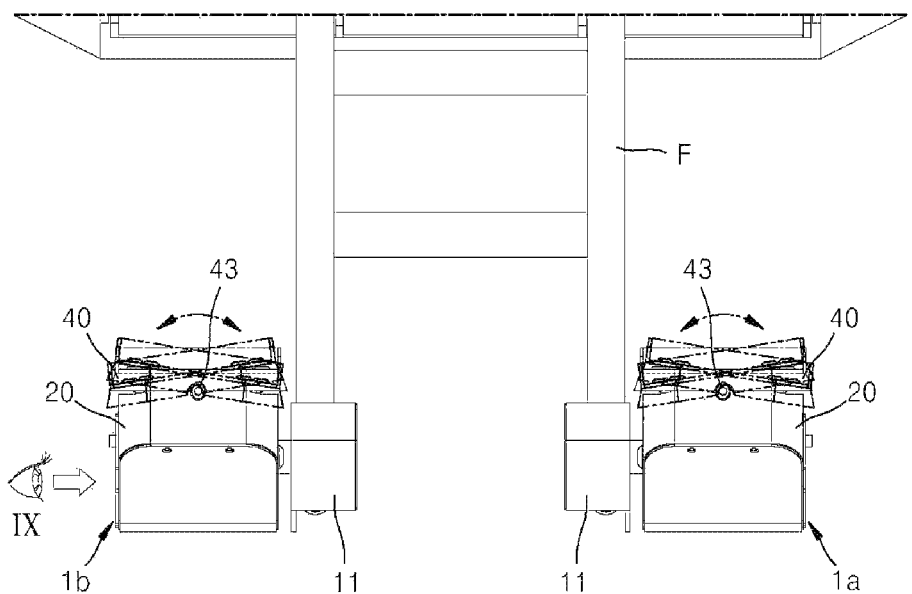
FIG. 8 is an extracted front view taken in a direction indicated by VII of FIG. 7.

As shown in FIGS. 8 and 14, the leftward and rightward turning sensors 71 and 73 of the leftward and rightward turning sensing means 70 also sense leftward turning (turning in the clockwise direction in the figures) and leftward turning (turning in the counterclockwise direction in the figures) of the foothold 40, respectively, and transmit signals thereof to the communication and control unit 80 of the simulation device.

The operation pedal 1 of the simulation device according to the present invention is a two-unit operation pedal 1 including a left pedal 1a and a right pedal 1b, which the user operates using two feet F. Consequently, it is possible to realize and control various actions of the play target in the game through a combination of the left and right pedals 1a and 1b.

Figure 13:
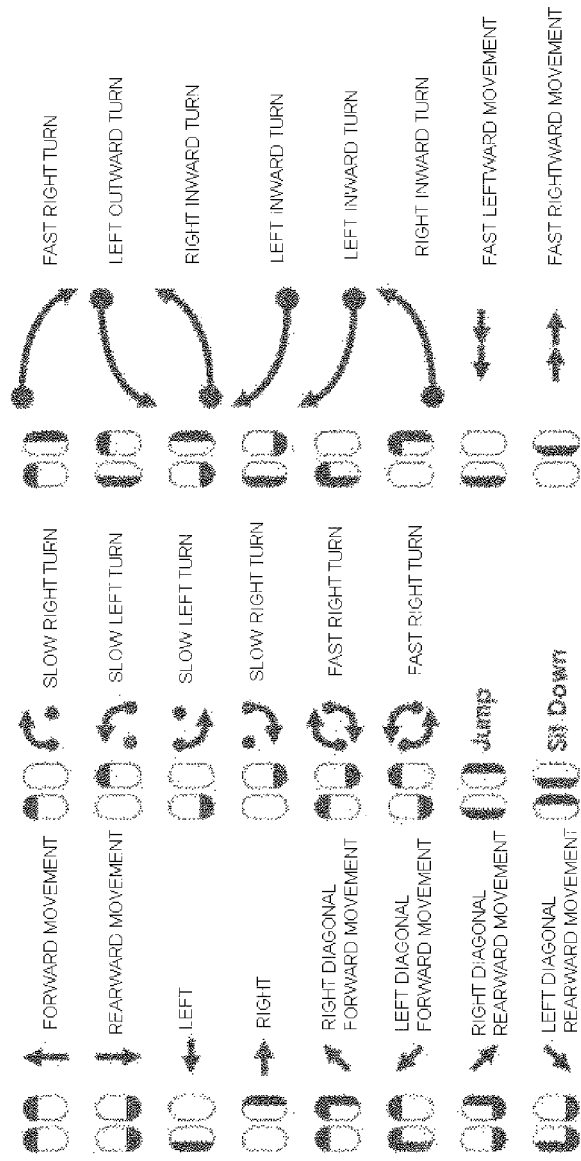
FIG. 13 is an illustration chart showing a method of operating the operation pedal according to the present invention.

FIG. 13 illustrates a method of operating the operation pedal according to the present invention. Referring to this figure, as in a tracked vehicle driving mode, the play target moves forwards when both the left and right pedals 1a and 1b are pushed forwards, the play target moves rearwards when both the left and right pedals 1a and 1b are pushed rearwards, the play target moves sidewise rightwards when only the right pedal 1b is pushed rightwards, and the play target moves sidewise leftwards when only the left pedal 1a is turned leftwards.

In addition, the play target pivots on the right foot in the clockwise direction or in the counterclockwise direction when only the left pedal 1a is turned forwards or rearwards, and the play target pivots on the left foot in the clockwise direction or in the counterclockwise direction when only the right pedal 1b is turned forwards or rearwards.

The play target jumps in place when the left and right pedals 1a and 1b are simultaneously pushed outwards, the play target jumps leftwards or rightwards when the left and right pedals 1a and 1b are simultaneously pushed leftwards or rightwards, and the play target sits in place when the left and right pedals 1a and 1b are simultaneously pushed inwards.

The play target largely rotates while moving sidewise leftwards when the front or the rear of the right pedal 1b is pushed while the outside of the left pedal 1a is pushed, the play target largely rotates while moving sidewise rightwards when the left and right pedals are operated in a manner opposite the above case, the play target turns right in place when the right pedal 1b is turned rearwards while the left pedal 1a is turned forwards, and the play target turns left in place when the left and right pedals 1a and 1b are operated in a manner opposite the above case.

As described above, the operation pedal according to the present invention is characterized in that the play target moves in a direction in which the operation pedal is pushed. When a middle portion between the front and the side of the pedal is pushed using such a characteristic, the play target moves halfway between two directions. Consequently, operation may be performed in various cases utilizing this point.

In the case in which forward and rearward turning and leftward and rightward turning of the left pedal 1a and the right pedal 1b are appropriately combined with each other, as described above, it is possible to variously realize the action of the play target in the game and for the user to easily control the same using two feet, whereby it is possible for the user to enjoy pleasure full of a sense of reality while more easily playing the game.

The above operations will be described in more detail with reference to FIG. 14. Forward and rearward turning sensing means 60b and 60a and leftward and rightward turning sensing means 70b and 70a of the right pedal 1b and the left pedal 1a sense forward and rearward turning of the pedal main body 20 and leftward and rightward turning of the foothold 40, and transmit signals thereof to the communication and control unit 80.

The communication and control unit 80 transmits the signals to a game program (a PC or a game console) 90, and the play target in the game takes a predetermined action in response to the signals of the respective sensing means 60a, 60b, 70a, and 70b transmitted to the game program 90.

In the operation pedal 1 of the simulation device according to the present invention, as described above, the forward and rearward turning sensing means 60a and 60b and the leftward and rightward turning sensing means 70a and 70b of the left pedal 1a and the right pedal 1b are independently driven, whereby it is possible to achieve various combinations of control signals, and therefore it is possible to enable the play target in the game to take various actions having a higher sense of reality.

In particular, this merit enables the user to easily control various actions in a virtual reality game, which has been in the spotlight in recent years, using two feet F1 and F2 to thus enjoy a higher sense of reality and interest in the game.

Meanwhile, in the case in which the operation pedal 1 of the simulation device according to the present invention is coupled to a multi-axis control chair unit 110 configured to be driven in, for example, two or three axis directions, it is possible to enable for the user to enjoy simulation having a higher sense of reality.

That is, the chair C, in which the user sits, is rotated leftwards and rightwards, is shaken forwards and rearwards, or is driven upwards and downwards or in an arbitrary direction so as to correspond to the action of the play target in the program in response to the control signals transmitted from the forward and rearward turning sensing means 60a and 60b and the leftward and rightward turning sensing means 70a and 70b of the left pedal 1a and the right pedal 1b, whereby it is possible for the use to enjoy a play having a higher sense of reality as if the user became the play target in the program.

In the simulation device according to the present invention, a display unit (not shown in the figures) configured to visually show a virtual space may be further installed. The display unit may be realized by an LCD or LED monitor installed at an operation unit, or may be realized by an HMD for virtual reality.

Meanwhile, FIGS. 15 to 19 show another embodiment of the operation pedal 1 of the simulation device according to the present invention. In this embodiment, the operation pedal 1 further includes a swing foothold 120, compared to the previous embodiment, and this embodiment is identical in construction to the previous embodiment except for the foothold 40, and therefore a duplicate description thereof will be omitted for the sake of convenience.

In this embodiment, the operation pedal 1 further includes a swing foothold 120 installed on the foothold 40 so as to be rotated by a predetermined angle in a horizontal direction by external force and a swing foothold rotation sensing means configured to sense rotation of the swing foothold 120 and to output a signal thereof.

To this end, the foothold 40 has an assembly hole 45 formed in the center thereof. The assembly hole 45 is configured to have a two-stage slot shape in which a step portion 46 is formed in the middle thereof in order to install a swing foothold position setting means 130, a description of which will follow.

The swing foothold 120 has a rotary shaft 121 formed at the center of the lower surface thereof. A cylindrical rotation guide 122 is provided around the rotary shaft 121 so as to protrude, and is rotatably coupled to the assembly hole 45 of the foothold 40. A bearing 123 may be interposed between the rotation guide 122 and the assembly hole 45 such that the swing foothold 120 can be smoothly rotated.

In addition, a fence 124 configured to support the heel portion of the user is provided at the edge of the rear end of the upper surface of the swing foothold 120. As a result, the support flange 44 provided at the foothold 40 according to the previous embodiment is removed.

Various kinds of sensors may be adopted as the swing foothold rotation sensing means. For example, as shown, the swing foothold rotation sensing means may be realized by an encoder 140 mounted to the lower part of the foothold 40, the encoder having a rotary shaft 141 connected to the rotary shaft 121 of the swing foothold 120 through the assembly hole 45.

Meanwhile, the swing foothold 120 may be maintained in a neutral state by a swing foothold position setting means 130 configured to maintain the swing foothold at a predetermined reference position when no external force is applied to the swing foothold and to allow the swing foothold to be rotated leftwards or rightwards only when external force is applied to the swing foothold such that the swing foothold is accurately operated.

The swing foothold position setting means 130 may be variously configured. For example, as shown, the swing foothold position setting means 130 may include a guide slot 131 formed in the step portion 46 of the assembly hole 45 of the foothold 40 in an arc shape so as to have the same curvature as the rotary shaft 121 of the swing foothold 120, a stopper 132 provided on the lower surface of the swing foothold 120 in a protruding state so as to be movable along the guide slot 131, and a torsion spring 133 located around the bearing 123, opposite ends of the torsion spring being located in elastic contact with opposite sides of the stopper 132.

The opposite ends of the torsion spring 133 invade the opposite ends of the guide slot 131 and are supported by the inner circumference of the assembly hole 45 while elastically pushing the opposite sides of the stopper 132, whereby the swing foothold 120 is stably located at a predetermined reference position, allows rotation of the swing foothold 120 when external force is applied, and returns the swing foothold to the initial position thereof.

That is, when the swing foothold 120 is rotated leftwards and rightwards by external force, one side of the stopper 132 is rotated along the guide slot 131 by an allowed margin while elastically deforming a corresponding end of the torsion spring 133. When the external force is removed, the swing foothold is returned to the initial position thereof by restoring force of the torsion spring 133.

Two swing footholds 120 may be independently operated. However, it is not easy for the user to individually operate the swing footholds using the two feet due to characteristics of the human body. For this reason, a swing foothold interlocking means 150 may be further provided such that the two swing footholds 120 can be simultaneously rotated in the same direction.

Figure 20:
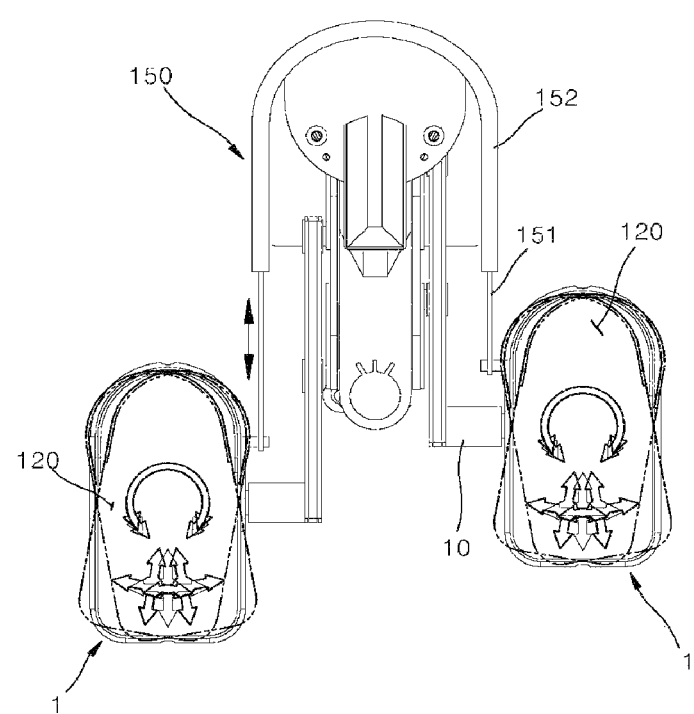
FIG. 20 is a plan view schematically showing an interlocking means of a swing foothold of the operation pedal shown in FIG. 15.

The swing foothold interlocking means 150 may be variously configured. As shown in FIG. 20, the swing foothold interlocking means may include an interlocking wire 151 having a predetermined transfer track, opposite ends of the interlocking wire being connected to the two swing footholds 120, and a wire guide 152 configured to guide the interlocking wire 151 so as to be pulled along the transfer track.

In the embodiment having the above construction, leftward and rightward rotation is further performed in addition to the operation and effects of the previous embodiment, whereby it is possible to combine a larger number of control signals, and therefore it is possible to further improve an effect of realizing the action of a character.

Figure 21:
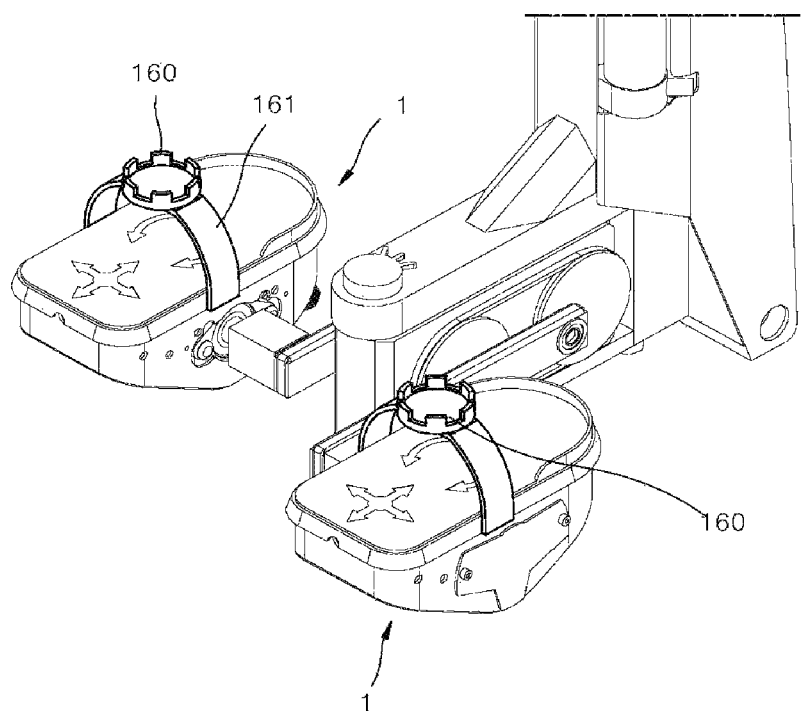
FIG. 21 is a perspective view showing the state in which the operation pedal system of the simulation device according to the present invention is provided with a tracking sensor.

Meanwhile, in the operation pedal system 1 of the simulation device according to the present invention, the user rotates the swing footholds 120 using the two feet in the forward direction or in the reverse direction such that the character in virtual reality moves. As shown in FIG. 21, a tracking sensor 160 is provided at each operation pedal 1 in order to control the movement of the character so as to correspond to the movement tracks of the feet of the user that rotates the swing footholds 120.

The tracking sensor 160 may be mounted to each operation pedal 1 via a band 161 so as to be attached to the foot of the user for accurate sensing.

In the case in which the tracking sensor is mounted, as described above, it is possible to sense more three-dimensional movement, and therefore it is possible to produce a more realistic situation.

The present invention illustrated and described above is not limited to the above embodiment, and may be implemented in various forms without departing from the gist of the present invention. For example, the sensor applied to the present invention may be variously changed as needed, and the shape and disposition of parts constituting the pedal may be arbitrarily changed depending on a target to which the pedal is applied.

INDUSTRIAL APPLICABILITY

In an operation pedal of a simulation device according to the present invention, and a method of operating the same, it is possible for a user to control various actions of a play target using two feet. Consequently, it is possible for the user to separately utilize two hands, whereby it is possible to produce a wide range of operation patterns to thus simulate various kinds of complicated programs based thereon.

The invention claimed is:

1. An operation pedal of a simulation device, the operation pedal comprising:
   a stationary shaft horizontally installed;
   a pedal main body mounted to the stationary shaft, the pedal main body being configured to be turned in a forward-rearward direction by external force;
   a foothold mounted to an upper surface of the pedal main body, the foothold being configured to be turned in a leftward-rightward direction by external force;
   a forward and rearward turning sensing means configured to sense forward and rearward turning of the pedal main body and to transmit a signal thereof; and
   a leftward and rightward turning sensing means configured to sense leftward and rightward turning of the foothold and to transmit a signal thereof.

2. The operation pedal according to claim 1, wherein the forward and rearward turning sensing means comprises:
   a sensing dog mounted to the stationary shaft; and
   forward and rearward turning sensors installed at the pedal main body so as to be located at a front and a rear of the stationary shaft, the forward and rearward turning sensors being configured to come into contact with the sensing dog according to forward and rearward turning of the pedal main body.

3. The operation pedal according to claim 1, further comprising a main body position setting means configured to maintain the pedal main body so as to be placed at a predetermined reference position in a state in which there is no external force and to allow the pedal main body to be turned when external force is applied thereto.

4. The operation pedal according to claim 3, wherein the main body position setting means comprises:
   a torsion spring mounted to the stationary shaft;
   a spring guide fixed to the stationary shaft so as to support the torsion spring; and
   front and rear pushers provided at the pedal main body so as to come into contact with opposite free ends of the torsion spring, respectively.

5. The operation pedal according to claim 4, wherein an upper surface of the spring guide is formed as an inclined surface that is gradually inclined downwards from a middle portion to opposite ends thereof in a forward-rearward direction.

6. The operation pedal according to claim 1, wherein the leftward and rightward turning sensing means comprises:
   leftward and rightward turning sensors mounted to the pedal main body; and
   left and right sensing protrusions provided respectively at opposite sides of a lower surface of the foothold so as to come into contact with the leftward and rightward turning sensors according to turning of the foothold.

7. The operation pedal according to claim 6, wherein a lower surface of each of the sensing protrusions configured to come into contact the leftward and rightward turning sensors is formed as an inclined surface.

8. The operation pedal according to claim 1, further comprising a foothold position setting means configured to maintain the foothold so as to be placed at a predetermined reference position in a state in which there is no external force and to allow the foothold to be turned when external force is applied thereto.

9. The operation pedal according to claim 1, further comprising:
   a swing foothold installed on the foothold so as to be rotated by a predetermined angle in a horizontal direction by external force; and
   a swing foothold rotation sensing means configured to sense rotation of the swing foothold and to output a signal thereof.

10. The operation pedal according to claim 9, further comprising a swing foothold position setting means configured to maintain the swing foothold so as to be placed at a predetermined reference position in a state in which there is no external force and to allow the swing foothold to be rotated when external force is applied thereto.

11. The operation pedal according to claim 10, wherein the swing foothold position setting means comprises:
   an arc-shaped guide slot formed in the foothold so as to have a curvature corresponding to a rotational curvature of the swing foothold;
   a stopper provided at the swing foothold so as to be moved along the guide slot; and
   an elastic means configured to elastically bias opposite sides of the stopper in opposite directions.

12. The operation pedal according to claim 9, wherein the swing foothold is installed at each of two pedals, such as a left pedal and a right pedal, and
   the operation pedal further comprises a swing foothold interlocking means configured to allow the two swing footholds to be simultaneously rotated in an identical direction.

13. The operation pedal according to claim 12, wherein the swing foothold interlocking means comprises:
   an interlocking wire having opposite ends connected respectively to the swing footholds; and
   a wire guide configured to guide the interlocking wire so as to be pulled along a predetermined track when the swing footholds are rotated.

14. A method of operating an operation pedal of a simulation device in order to move a play target, the simulation device comprising two pedals, such as a left pedal and a right pedal, wherein
   the play target moves forwards when both the left and right pedals are pushed forwards,
   the play target moves rearwards when both the left and right pedals are pushed rearwards, the play target moves sidewise rightwards when only the right pedal is pushed rightwards, the play target moves sidewise leftwards when only the left pedal is pushed leftwards, the play target pivots on a right foot in a clockwise direction or in a counterclockwise direction when only the left pedal is pushed forwards or rearwards, the play target pivots on a left foot in the clockwise direction or in the counterclockwise direction when only the right pedal is pushed forwards or rearwards, the play target jumps in place when the left and right pedals are simultaneously pushed outwards, the play target jumps leftwards or rightwards when the left and right pedals are simultaneously pushed leftwards or rightwards, the play target turns right in place when the right pedal is pushed rearwards while the left pedal is pushed forwards, and the play target turns left in place when the left pedal is pushed rearwards while the right pedal is pushed forwards.

15. The method according to claim 14, wherein the left turn or the right turn is performed by horizontally rotating the left pedal or the right pedal.

\* \* \* \* \*